US009685885B2

(12) United States Patent
Fujikawa et al.

(10) Patent No.: US 9,685,885 B2
(45) Date of Patent: Jun. 20, 2017

(54) POWER CONVERSION APPARATUS WITH AN INVERTED-VOLTAGE GENERATION CIRCUIT

(71) Applicants: Sumitomo Electric Industries, Ltd., Osaka-shi (JP); National University Corporation TOYOHASHI UNIVERSITY OF TECHNOLOGY, Toyohashi-shi (JP)

(72) Inventors: Kazuhiro Fujikawa, Osaka (JP); Takashi Ohira, Toyohashi (JP); Minoru Mizutani, Toyohashi (JP)

(73) Assignees: Sumitomo Electric Industries, Ltd., Osaka-shi (JP); National University Corporation Toyohashi University of Technology, Toyohashi-shi (JP)

( * ) Notice: Subject to any disclaimer, the term of this patent is extended or adjusted under 35 U.S.C. 154(b) by 0 days.

(21) Appl. No.: 14/899,897

(22) PCT Filed: May 28, 2014

(86) PCT No.: PCT/JP2014/064190
§ 371 (c)(1),
(2) Date: Dec. 18, 2015

(87) PCT Pub. No.: WO2014/203697
PCT Pub. Date: Dec. 24, 2014

(65) Prior Publication Data
US 2016/0149513 A1    May 26, 2016

(30) Foreign Application Priority Data
Jun. 21, 2013 (JP) .................................. 2013-130740

(51) Int. Cl.
*H02M 7/538* (2007.01)
*H02M 7/48* (2007.01)
(Continued)

(52) U.S. Cl.
CPC ............ *H02M 7/48* (2013.01); *H02M 7/5387* (2013.01); *H02M 7/5388* (2013.01); *H02M 2001/123* (2013.01)

(58) Field of Classification Search
CPC ............ H02M 2001/123; H02M 7/537; H02M 7/5387; H02M 7/5388
See application file for complete search history.

(56) References Cited

U.S. PATENT DOCUMENTS 5,831,842 A * 11/1998 Ogasawara ............. H02M 1/12
363/34
6,075,717 A * 6/2000 Kumar .................. H02M 5/4505
363/128

FOREIGN PATENT DOCUMENTS

JP    H08-340677 A    12/1996
JP    H09-037593 A     2/1997
(Continued)

OTHER PUBLICATIONS

JP 2006-333647 translation document (PDF), originally published on Jul. 12, 2006.*
(Continued)

*Primary Examiner* — Fred E Finch, III
*Assistant Examiner* — Rafael O De Leon Domenech
(74) *Attorney, Agent, or Firm* — Venable LLP; Michael A. Sartori; Ilya A. Svetlov

(57) ABSTRACT

A power conversion apparatus 1 according to an embodiment of the present invention includes a high-voltage side input terminal $T_{IH}$ and a low-voltage side input terminal $T_{IL}$, first and second output terminals $T_{O1}$ and $T_{O2}$, a power conversion circuit 10 that converts direct-current power input between the high-voltage side input terminal $T_{IH}$ and the low-voltage side input terminal $T_{IL}$ to generate alternating-current power between the first and second output terminals $T_{O1}$ and $T_{O2}$, and an inverted-voltage generation
(Continued)

circuit 30 that generates an inverted voltage of a common mode voltage generated between the first and second output terminals $T_{O1}$ and $T_{O2}$ and inputs the inverted voltage to the low-voltage side input terminal $T_{IL}$.

2 Claims, 16 Drawing Sheets

(51) Int. Cl.
*H02M 7/5387* (2007.01)
*H02M 7/5388* (2007.01)
*H02M 1/12* (2006.01)

(56) References Cited

FOREIGN PATENT DOCUMENTS

| | | |
|---|---|---|
| JP | 2003-088130 A | 3/2003 |
| JP | 2006-333647 A | 12/2006 |

OTHER PUBLICATIONS

Imai, "Power Electronics Handbook," R&D Planning Co., Ltd., Feb. 20, 2002, p. 328-337.
International Preliminary Report on Patentability and Written Opinion in Patent Application No. PCT/JP2014/064190, dated Dec. 22, 2015.

\* cited by examiner

*Fig.8*
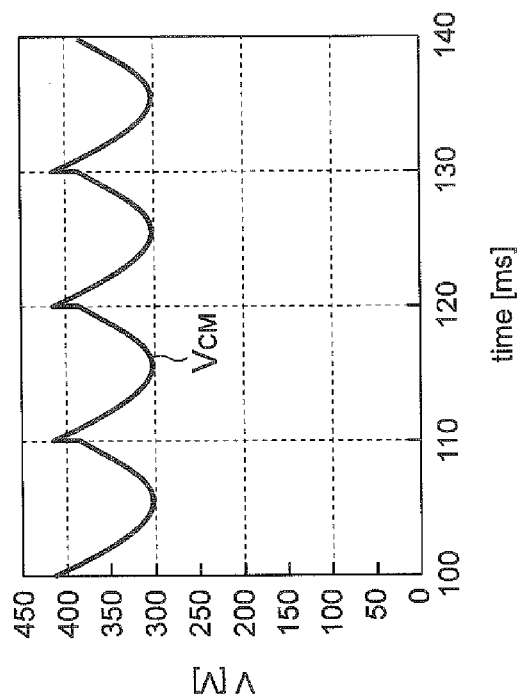
(b)
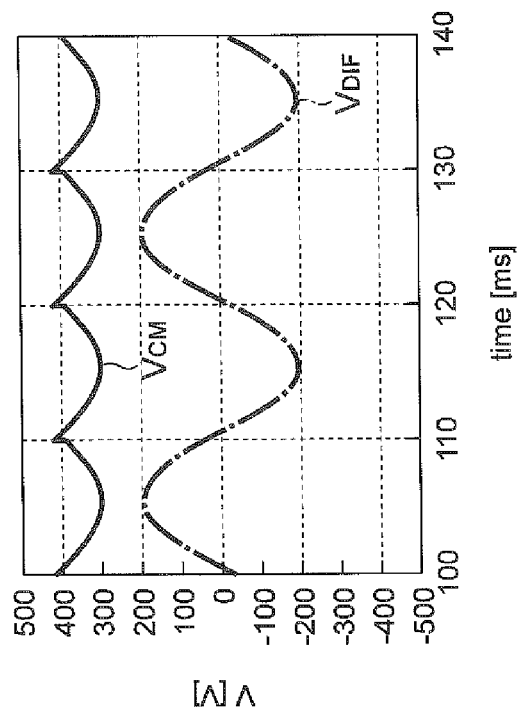
(a)

Fig.9
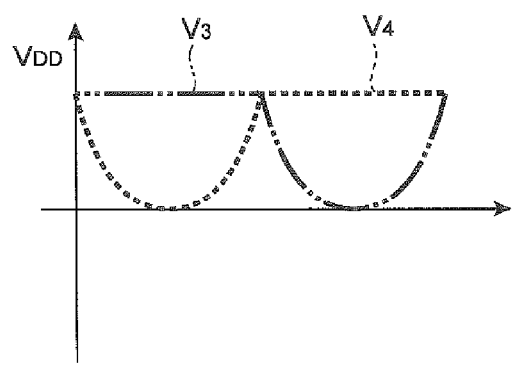
(a)
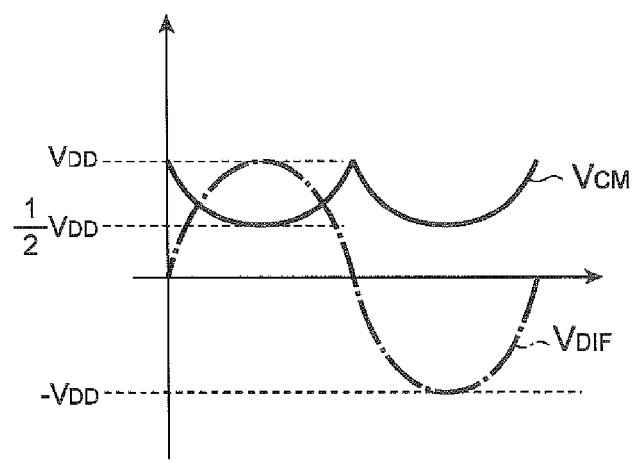
(b)

Fig.12
(a)
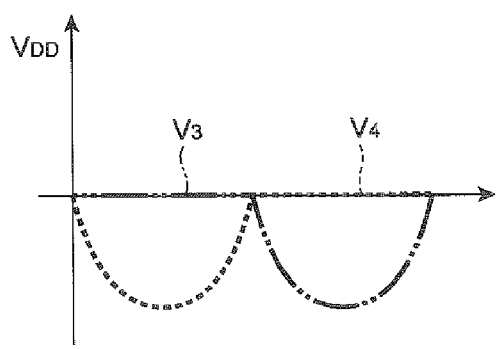
(b)
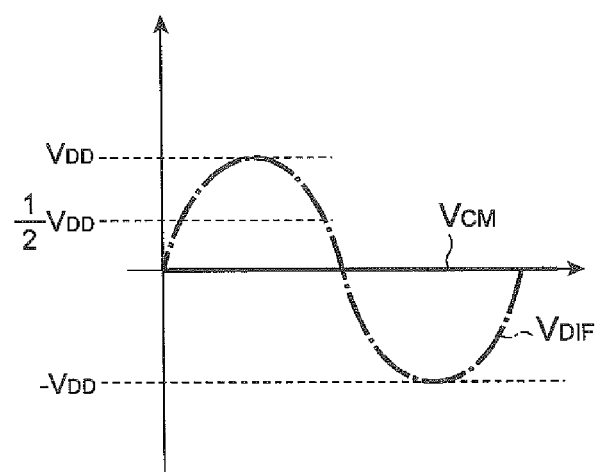

Fig.16
(a)
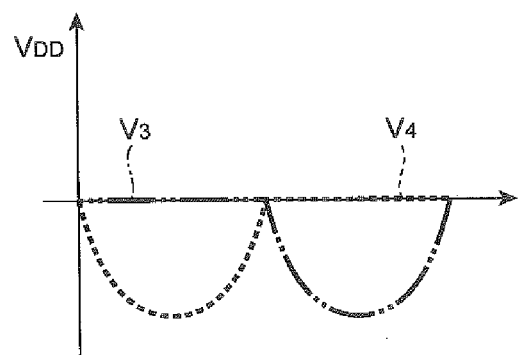
(b)
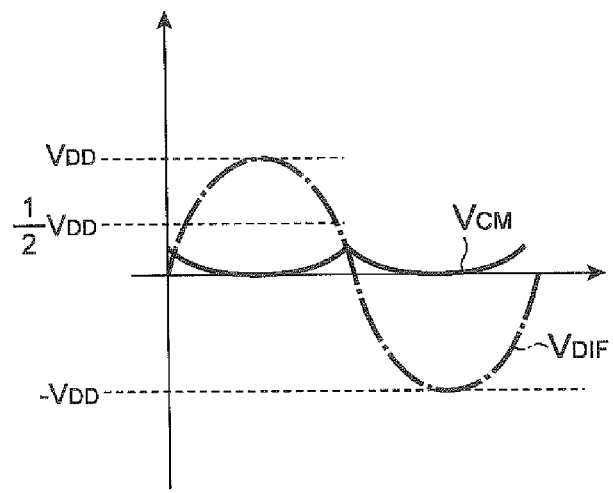

POWER CONVERSION APPARATUS WITH AN INVERTED-VOLTAGE GENERATION CIRCUIT

TECHNICAL FIELD

The present invention relates to a power conversion apparatus that converts direct-current power into alternating-current power.

BACKGROUND ART

As a power conversion circuit that converts direct-current power into alternating-current power, a bridge-type inverter is widely known. Non Patent Literature 1 discloses the bridge-type invert of this type.

The bridge inverter includes first and second switching elements connected in series in this order between a high-voltage side input terminal and a low-voltage side input terminal and third and fourth switching elements connected in series in this order between the high-voltage side input terminal and the low-voltage side input terminal. The bridge inverter alternately switches a set of the first and fourth switching elements and a set of the second and third switching elements to an ON state to thereby generate alternating-current power between an intermediate node of the first and second switching elements and an intermediate node of the third and fourth switching elements (e.g., FIGS. 6 and 9).

Non Patent Literature 1 discloses a bridge-type inverter that performs switching control using a pulse width modulation (PWM) system in a period in which sets of switching elements are in an ON state (e.g., FIG. 13).

CITATION LIST

Non Patent Literature

NPL 1: Koji Imai, "Power Electronics Handbook", R & D PLANNING CO., LTD., February 2002, p 328 to p 337

SUMMARY OF INVENTION

Technical Problem

Incidentally, in the bridge-type power conversion circuit of this type, four switching elements are necessary. All the switching elements are subjected to switching control at the same frequency. Therefore, a switching element capable of performing a relatively high-speed operation needs to be used as all the switching elements. It is difficult to reduce a price.

Concerning this point, the inventors devised the idea of subjecting, for example, in a bridge inverter, second and fourth switching elements on a lower arm side at a frequency higher than a frequency for first and third switching elements on an upper arm side. According to this idea, a switching element having relatively low operation speed and a low price can be used as the switching elements on the upper arm side. It is possible to reduce a price of the power conversion circuit.

However, the inventors obtained the knowledge that, if the switching elements on the lower arm side are subjected to the switching control at a frequency higher than a frequency for the switching elements on the upper arm side, a high common mode voltage is generated on an output side (a load side). Even if the switching elements on the upper arm side are subjected to the switching control at a frequency higher than a frequency for the switching elements on the lower arm side, a high common mode voltage is generated on the output side (the load side).

Therefore, it is an object of the present invention to provide a power conversion apparatus capable of suppressing a high common mode voltage from being generated on an output side.

Solution to Problem

A power conversion apparatus of this application is a power conversion apparatus including: a high-voltage side input terminal and a low-voltage side input terminal; first and second output terminals; a power conversion circuit that converts direct-current power input between the high-voltage side input terminal and the low-voltage side input terminal to generate alternating-current power between the first and second output terminals; and an inverted-voltage generation circuit that generates an inverted voltage of a common mode voltage generated between the first and second output terminals and inputs the inverted voltage to the low-voltage side input terminal.

Advantageous Effects of Invention

According to the above description, it is possible to suppress a high common mode voltage from being generated on an output side.

BRIEF DESCRIPTION OF DRAWINGS

FIG. 8 is a simulation result in FIG. 7, wherein (a) is an output alternating-current voltage and an output common mode voltage and (b) is an enlarged output common mode voltage.

FIG. 9 is a principle diagram of voltages of sections on an output side in FIG. 7, wherein (a) is voltages of respective first and second output terminals and (b) is an output alternating-current voltage and an output common mode voltage.

FIG. 12 is a principle diagram of voltages of sections on an output side in FIG. 10, wherein (a) is voltages of respective first and second output terminals and (b) is an output alternating-current voltage and an output common mode voltage.

FIG. 16 is a principle diagram of voltages of sections on an output side in FIG. 14, wherein (a) is voltages of respective first and second output terminals and (b) is an output alternating-current voltage and an output common mode voltage.

DESCRIPTION OF EMBODIMENTS

Figure 1:
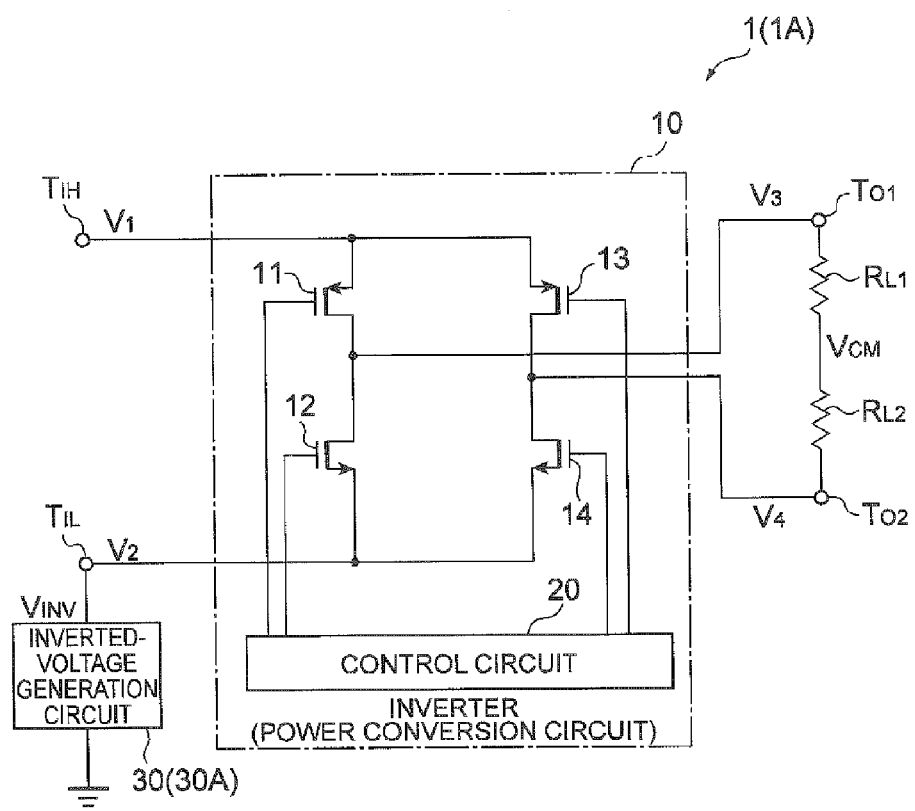
FIG. 1 is a circuit diagram showing a power conversion apparatus according to first and second embodiments of the present invention.

Explanation of Embodiments of the Present Invention

First, embodiments of the present invention are enumerated and explained.

A power conversion apparatus of this application is a power conversion apparatus including a high-voltage side input terminal and a low-voltage side input terminal, first and second output terminals, a power conversion circuit that converts direct-current power input between the high-voltage side input terminal and the low-voltage side input terminal to generate alternating-current power between the first and second output terminals, and an inverted-voltage generation circuit that generates an inverted voltage of a common mode voltage generated between the first and second output terminals and inputs the inverted voltage to the low-voltage side input terminal.

With the power conversion apparatus, the inverted-voltage generation circuit generates the inverted voltage of the common mode voltage generated on an output side and inputs the inverted voltage to the low-voltage side input terminal. Therefore, it is possible to suppress a high common mode voltage from being generated on the output side.

The power conversion circuit explained above may be a bridge-type power conversion circuit including first and second switching elements connected in series in this order between a high-voltage side input terminal and a low-voltage side input terminal, an intermediate node of the first and second switching elements being connected to the first output terminal, and third and fourth switching elements connected in series in this order between the high-voltage side input terminal and the low-voltage side input terminal, an intermediate node of the third and fourth switching elements being connected to the second output terminal, the power conversion circuit alternately switching a set of the first and fourth switching elements and a set of the second and third switching elements to an ON state to thereby convert direct-current power input between the high-voltage side input terminal and the low-voltage side input terminal to generate alternating-current power between the first and second output terminals. The power conversion circuit may subject one of the set of the first and third switching elements and the set of the second and fourth switching elements to switching control at a frequency higher than a frequency for the other set.

With the power conversion circuit, by subjecting one of the set of the first and third switching elements and the set of the second and fourth switching elements to the switching control at a frequency higher than a frequency for the other set, switching elements having relatively low operation speed and a low price compared with the switching elements of the other set can be used. Therefore, with the power conversion circuit, it is possible to reduce a price.

The inverted-voltage generation circuit may invert a common mode voltage generated between the first and second output terminals to thereby generate the inverted voltage or may generate the common mode voltage independently from the common mode voltage generated between the first and second output terminals, and invert the common mode voltage to thereby generate the inverted voltage. The inverted-voltage generation circuit may include a configuration that is identical to a configuration of the power conversion circuit.

Incidentally, as switching elements in a bridge-type circuit, a CMOSFET (Complementary Metal Oxide Semiconductor Field Effect Transistors) is sometimes used. That is, a PMOSFET (P-channel Metal Oxide Semiconductor Field Effect Transistor) is sometimes used as first and third switching elements on an upper arm side, and an NMOSFET (N-channel Metal Oxide Semiconductor Field Effect Transistor) is sometimes used as second and fourth switching elements on a lower arm side. The CMOSFET has an advantage that driving by a clock signal is easy. On the other hand, the CMOSFET has a problem in that an increase in speed of switching control is difficult because the PMOSFET tends to have low operation speed compared with the NMOSFET.

The power conversion circuit may subject the set of the second and fourth switching elements to the switching control at a frequency higher than a frequency for the set of the first and third switching elements.

Consequently, the second and fourth switching elements on the lower arm side are subjected to the switching control at the frequency higher than the frequency for the first and third switching elements on the upper arm side. Therefore, the power conversion circuit is suitable when the CMOSFET is used as the switching elements. It is possible to obtain both of high speed of the switching control and driving easiness of the switching elements.

The power conversion circuit may switch the first switching element to the ON state and subject the fourth switching element to the switching control using a pulse width modulation system in a period of a half cycle of alternating-current power in which the set of the first and fourth switching elements is switched to the ON state and switch the third switching element to the ON state and subject the second switching element to the switching control using the pulse width modulation system in a period of the other half cycle of the alternating-current power in which the set of the second and third switching elements is switched to the ON state.

The power conversion circuit may subject the first switching element to the switching control using a pulse width modulation system and subject the fourth switching element to the switching control at a frequency twice or more as high as a switching frequency for the first switching element using the pulse width modulation system in a period of a half cycle of alternating-current power in which the set of the first and fourth switching elements is switched to the ON state and subject the third switching element to the switching control using the pulse width modulation system and subject the second switching element to the switching control at a frequency twice or more as high as a switching frequency for the third switching element using the pulse width modulation system in a period of the other half cycle of the alternating-current power in which the set of the second and third switching elements is switched to the ON state.

Details of the Embodiment of the Present Invention

Specific examples of the power conversion apparatus according to the present invention are explained below with reference to the drawings. Note that the present invention is not limited to these illustrations and it is intended that all changes indicated by claims and within meanings and a scope equivalent to the claims are included in the present invention.

First Embodiment

Figure 2:
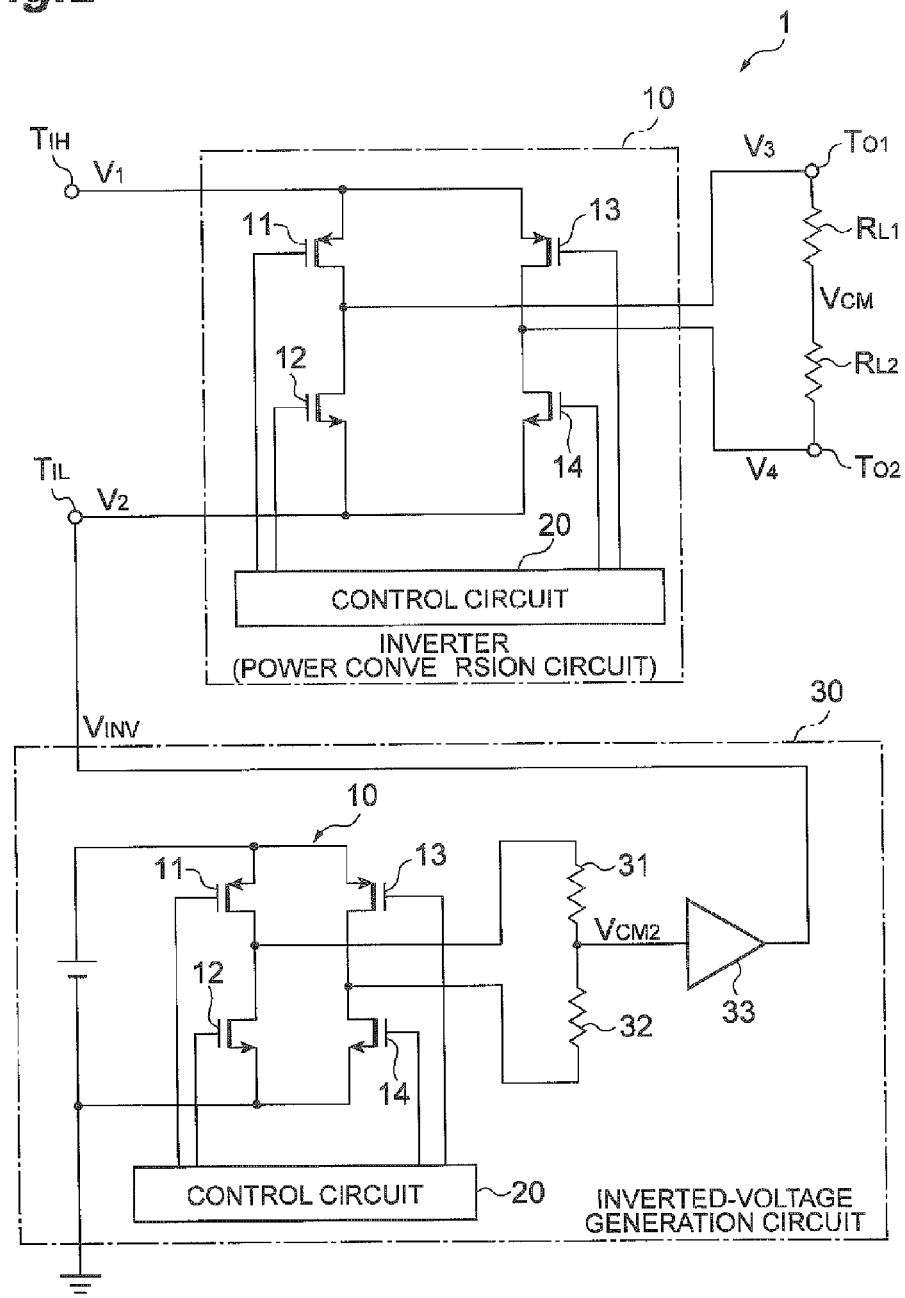
FIG. 2 is a circuit diagram showing in detail the power conversion apparatus in the first embodiment shown in FIG. 1.

FIG. 1 and FIG. 2 are circuit diagrams showing a power conversion apparatus according to a first embodiment of the present invention. A power conversion apparatus 1 in the first embodiment includes a high-voltage side input terminal $T_{IH}$ and a low-voltage side input terminal $T_{IL}$, first and second output terminals $T_{O1}$ and $T_{O2}$, a single-phase full-bridge type inverter (power conversion circuit) 10, and an inverted-voltage generation circuit 30. Note that, in FIG. 1 and FIG. 2, loads $R_{L1}$ and $R_{L2}$ (e.g., each having a resistance value of 50Ω) are connected in series between the first and second output terminals $T_{O1}$ and $T_{O2}$. A voltage at a connection point between the load $R_{L1}$ and the load $R_{L2}$, which is a voltage based on the ground, is referred to as common mode voltage $V_{CM}$.

The inverter 10 converts direct-current power input between the high-voltage side input terminal $T_{IH}$ and the low-voltage side input terminal $T_{IL}$ to generate single-phase alternating-current power between the first and second output terminals $T_{O1}$ and $T_{O2}$. The inverter 10 includes first to fourth switching elements 11 to 14 and a control circuit 20.

The first and second switching elements 11 and 12 are connected in series in this order between the high-voltage side input terminal $T_{IH}$ and the low-voltage side input terminal $T_{IL}$. An intermediate node of the first and second switching elements 11 and 12 is connected to the first output terminal $T_{O1}$. For example, the first switching element 11 on an upper arm side is the PMOSFET and the second switching element 12 on a lower arm side is the NMOSFET.

More specifically, a source terminal of the first switching element 11 is connected to the high-voltage side input terminal $T_{IH}$. A drain terminal of the first switching element 11 is connected to a drain terminal of the second switching element 12. A source terminal of the second switching element 12 is connected to the low-voltage side input terminal $T_{IL}$. The drain terminals of the first and second switching elements 11 and 12 are connected to the first output terminal $T_{O1}$. Gate terminals of the first and second switching elements 11 and 12 are connected to the control circuit 20.

Similarly, the third and fourth switching elements 13 and 14 are connected in series in this order between the high-voltage side input terminal $T_{IH}$ and the low-voltage side input terminal $T_{IL}$. The intermediate node of the third and fourth switching elements 13 and 14 is connected to the second output terminal $T_{O2}$. For example, the third switching element 13 on the upper arm side is the PMOSFET and the fourth switching element 14 on the lower arm side is the NMOSFET.

More specifically, a source terminal of the third switching element 13 is connected to the high-voltage side input terminal $T_{IH}$. A drain terminal of the third switching element 13 is connected to a drain terminal of the fourth switching element 14. A source terminal of the fourth switching element 14 is connected to the low-voltage side input terminal $T_{IL}$. The drain terminals of the third and fourth switching elements 13 and 14 are connected to the second output terminal $T_{O2}$. Gate terminals of the third and fourth switching elements 13 and 14 are connected to the control circuit 20.

The control circuit 20 performs switching control of the first to fourth switching elements 11 to 14. Specifically, the control circuit 20 alternately switches a set of the first and fourth switching elements 11 and 14 and a set of the second and third switching elements 12 and 13 to an ON state to thereby convert direct-current power input between the high-voltage side input terminal $T_{IH}$ and the low-voltage side input terminal $T_{IL}$ to generate single-phase alternating-current power between the first and second output terminals $T_{O1}$ and $T_{O2}$.

More specifically, the control circuit 20 switches the first switching element 11 to the ON state and subjects the fourth switching element 14 to the switching control using a pulse width modulation (PWM) system in a period of a half cycle of output single-phase alternating-current power in which the set of the first and fourth switching elements 11 and 14 is switched to the ON state. The control circuit 20 switches the third switching element 13 to the ON state and subjects the second switching element 12 to the switching control using the PWM system in a period of the other half cycle of the output single-phase alternating-current power in which the set of the second and third switching elements 12 and 13 is switched to the ON state.

That is, the control circuit 20 subjects the first and third switching elements 11 and 13 on the upper arm side to the switching control at a frequency of the output alternating-current power and subjects the second and fourth switching elements 12 and 14 on the lower arm side to the switching control at a frequency higher than the frequency for the first and third switching elements 11 and 13 using the PWM system.

Subsequently, the inverted-voltage generation circuit 30 generates an inverted voltage $V_{INV}$ of a common mode voltage generated between the first and second output terminals $T_{O1}$ and $T_{O2}$ and inputs the inverted voltage $V_{INV}$ to the low-voltage side input terminal $T_{IL}$. More specifically, the inverted-voltage generation circuit 30 includes a circuit configuration (the first to fourth switching elements 11 to 14 and the control circuit 20) that is identical to the circuit configuration of the inverter 10, resistance elements 31 and 32 connected in series between outputs of the inverter 10, and an inverting amplifier 33. The inverted-voltage generation circuit 30 generates, independently from the common mode voltage $V_{CM}$ generated between the first and second output terminals $T_{O1}$ and $T_{O2}$, a common mode voltage $V_{CM2}$ equivalent (substantially equal) to the common mode voltage $V_{CM}$. The inverted-voltage generation circuit 30 inverts the common mode voltage $V_{CM2}$ to thereby generate the inverted voltage $V_{INV}$ and applies the inverted voltage $V_{INV}$ between the low-voltage side input terminal $T_{IL}$ and the ground. A resistance value of the resistance elements 31 and 32 only has to be approximately 1 MΩ.

The operation of the inverter 10 is explained below. In this example, it is assumed that the first switching element 11 and the third switching element 13 are alternately subjected to on/off control at low speed (e.g., a frequency of 60 Hz). The fourth switching element 14 is subjected to the PWM control at high speed (e.g. 120 kHz) in a period in which the first switching element 11 is in the on state, and the second switching element 12 is subjected to the PWM control at high speed (e.g., 120 kHz) in a period in which the third switching element 13 is in the on state.

Figure 3:
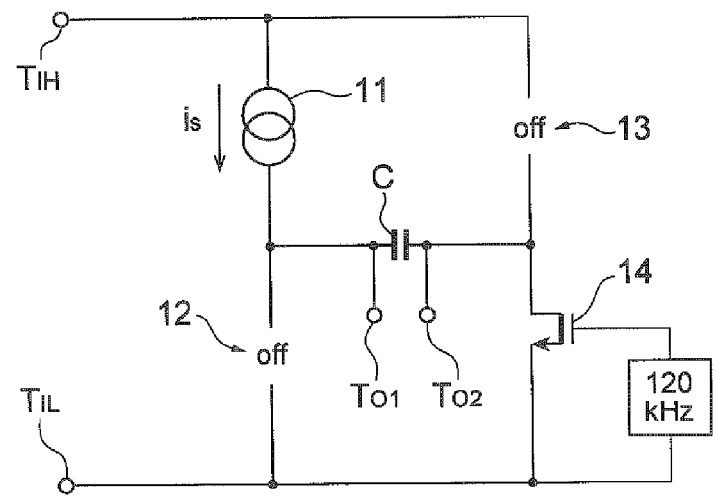
FIG. 3 is a diagram showing an equivalent circuit of an inverter (a power conversion circuit) in a period in which a first switching element is in an on state.
Figure 4:
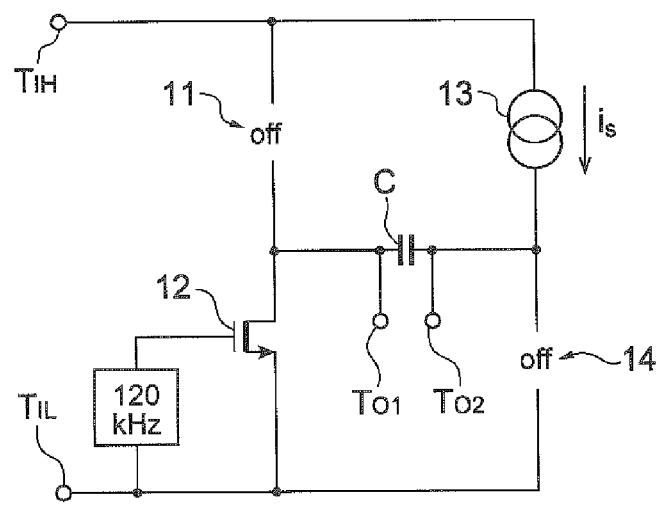
FIG. 4 is a diagram showing an equivalent circuit of the inverter in a period in which a third switching element is in the on state.

FIG. 3 is a diagram showing an equivalent circuit of the inverter 10 in the period in which the first switching element 11 is in the on state. FIG. 4 is a diagram showing an equivalent circuit of the inverter 10 in the period in which the third switching element 13 is in the on state. In FIG. 3 and FIG. 4, it is assumed that a smoothing capacitor (a capacitance value C) is connected between the first and second output terminals $T_{O1}$ and $T_{O2}$ in order to facilitate the following operation explanation. It is assumed that a resistance load (a resistance value R) is connected between the first and second output terminals $T_{O1}$ and $T_{O2}$. Note that $i_S$ in FIG. 3 and FIG. 4 is a saturation current value of each of the first and third switching elements 11 and 13.

Figure 5:
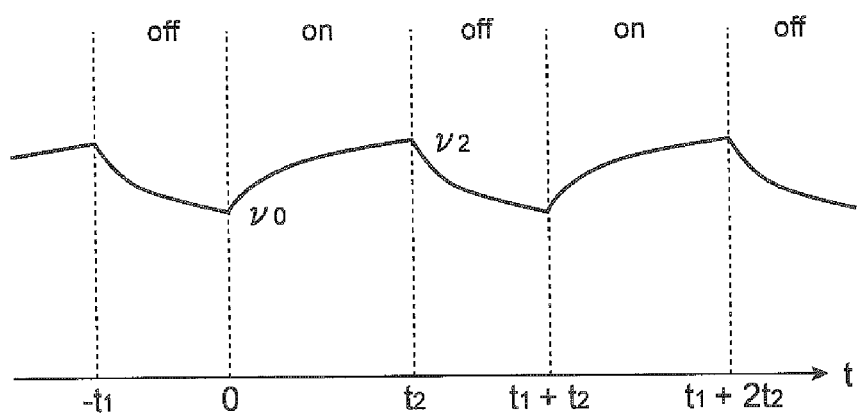
FIG. 5 is a diagram showing an output voltage of the inverter in the period in which the first switching element is in the on state.

FIG. 5 is a diagram showing an output voltage of the inverter 10 in the period in which the first switching element 11 is in the on state. In FIG. 5, time when the fourth switching element 14 is switched from the off state to the on state is set as the origin, an off time is represented as $t_1$, and an on time is represented as $t_2$. That is, one cycle of switching of on-off is $t_1+t_2$.

Figure 6:
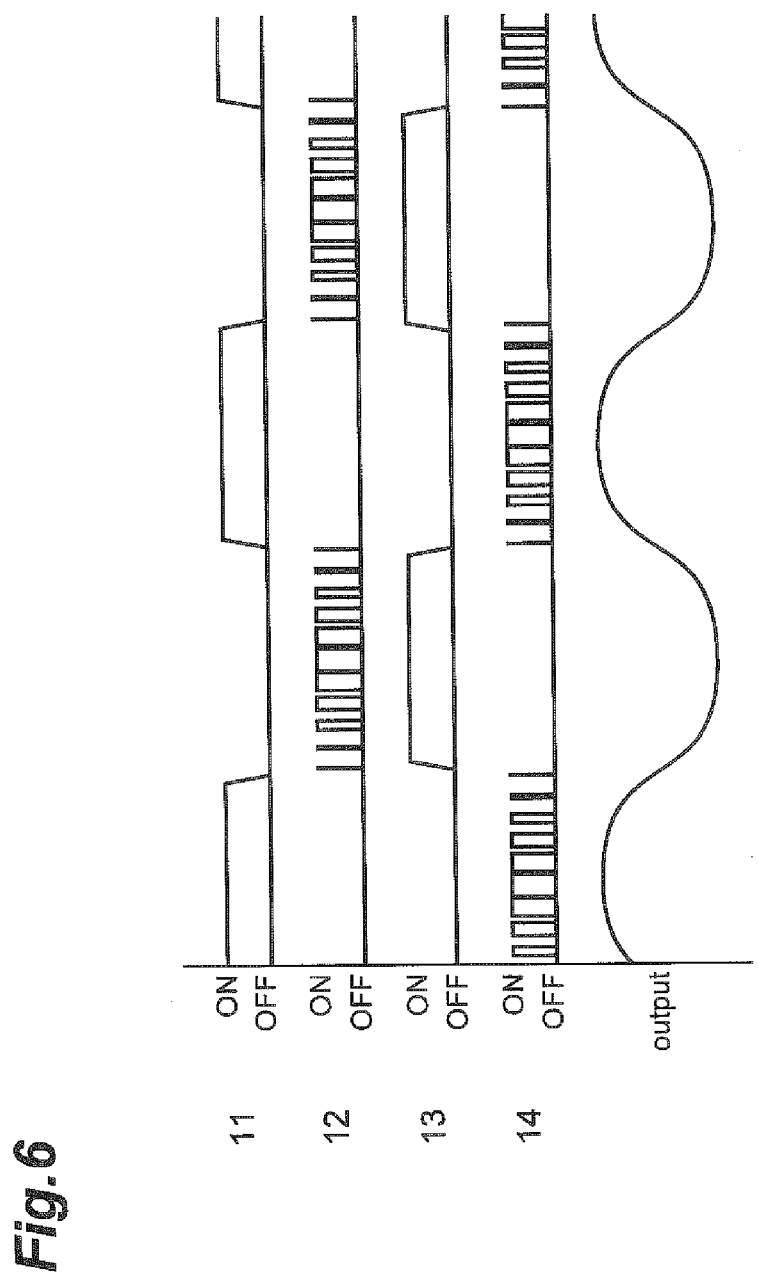
FIG. 6 is a diagram showing an output alternating-current voltage of the inverter.

FIG. 6 is a diagram showing an output voltage of the inverter 10. In FIG. 6, the on state and the off state of the first to fourth switching elements 11 to 14 are also shown.

First, as shown in FIG. 3 and FIG. 6, in the period in which the first switching element 11 is in the on state, the second and third switching elements 12 and 13 are retained in the off state. The fourth switching element 14 is subjected to the PWM control at, for example, 120 kHz.

When an output voltage v(t) of the inverter 10 is a function of time t, on the basis of the Kirchhoff's current equation, the following Expression (1) is obtained in a period in which the fourth switching element 14 is off and the following Expression (2) is obtained in a period in which the fourth switching element 14 is on.

[Math 1]

$$\frac{v(t)}{R} + C\frac{dv(t)}{dt} = 0 \quad (1)$$

$$\frac{v(t)}{R} + C\frac{dv(t)}{dt} = i_s \quad (2)$$

where, as explained above, C represents a capacitance value of the smoothing capacitor, R represents a resistance value of the resistance load, and $i_S$ represents a saturation current value of the first switching element 11.

The above Expressions (1) and (2) are first-order linear ordinary differential equations. A general solution of the above Expression (1) is calculated as indicated by the following Expression (3). A general solution of the above Expression (2) is calculated as indicated by the following Expression (4).

[Math 2]

$$v(t) = v_0 e^{-\sigma t} \quad (3)$$

$$v(t) = Ri_s + v_1 e^{-\sigma t} \quad (4)$$

where, σ represents a voltage attenuation constant, that is, an inverse 1/CR of a CR time constant and $v_0$ and $v_1$ represent integration constants decided from a voltage continuation condition on a time axis explained below, As shown in FIG. 5, at time t=0 when the fourth switching element 14 is switched from the off state to the on state, if the output voltage v(t) is continuous, the following Expression (5) is obtained from the above Expressions (3) and (4).

[Math 3]

$$v_0 = Ri_s + v_1 \quad (5)$$

As shown in FIG. 5, if one period of the off state and one period of the on state of the fourth switching element 14 are set as one cycle and the output voltage v(t) is cyclically continuous, that is, $v(-t_1)=v(t_2)$, the following Expression (6) is obtained from the above Expressions (3) and (4).

[Math 4]

$$v_0 e^{\sigma t_1} = Ri_s + v_1 e^{-\sigma t_2} \quad (6)$$

When the above Expressions (5) and (6) are set as a binary simultaneous equation to calculate $v_0$ and $v_1$, the following Expressions (7) and (8) are obtained.

[Math 5]

$$v_0 = \frac{1 - e^{-\sigma t_2}}{e^{\sigma t_1} - e^{-\sigma t_2}} Ri_s \quad (7)$$

$$v_1 = \frac{1 - e^{\sigma t_1}}{e^{\sigma t_1} - e^{-\sigma t_2}} Ri_s \quad (8)$$

When the above Expressions (7) and (8) are respectively substituted in the above Expressions (3) and (4), the following Expression (9) is obtained in the period in which the fourth switching element 14 is off and the following Expression (10) is obtained in the period in which the fourth switching element 14 is on.

[Math 6]

$$v(t) = \frac{1 - e^{-\sigma t_2}}{e^{\sigma t_1} - e^{-\sigma t_2}} Ri_s e^{-\sigma t} \quad (9)$$

$$v(t) = Ri_s + \frac{1 - e^{\sigma t_1}}{e^{\sigma t_1} - e^{-\sigma t_2}} Ri_s e^{-\sigma t} \quad (10)$$

In the expressions, when an output voltage at time $t=t_2$ is represented as $v_2$, the following Expression (11) is obtained from the above Expression (10).

[Math 7]

$$v_2 = v(t_2) = Ri_s + \frac{1 - e^{\sigma t_1}}{e^{\sigma t_1} - e^{-\sigma t_2}} Ri_s e^{-\sigma t_2} = \frac{(1 - e^{-\sigma t_2})e^{\sigma t_1}}{e^{\sigma t_1} - e^{-\sigma t_2}} Ri_s \quad (11)$$

The output voltage v(t) shown in FIG. 5 is calculated from the above Expressions (9), (10), and (11).

When the capacitance value C of the smoothing capacitor is increased, a time constant of the smoothing capacitor is sufficiently longer than one cycle $t_1+t_2$ of the on/off switching of the fourth switching element, thus the approximation as indicated by the following Expression (12) is established.

[Math 8]

$$\sigma t_1 \ll 1, \ \sigma t_2 \ll 1 \quad (12)$$

Then, the approximation as indicated by the following expression is established using an approximate formula $e^x=1+x$.

$$e^{\sigma t_1}=1+\sigma t_1,\ e^{-\sigma t_2}=1-\sigma t_2 \qquad \text{[Math 9]}$$

When these are applied to the above Expressions (9) and (10), the following Expression (13) is obtained in the period in which the fourth switching element 14 is off and the following Expression (14) is obtained in the period in which the fourth switching element 14 is on.

[Math 10]

$$v(t) = \frac{t_2 - \sigma t_2 t}{t_1 + t_2} R i_s \qquad (13)$$

$$v(t) = \frac{t_2 + \sigma t_1 t}{t_1 + t_2} R i_s \qquad (14)$$

That is, an output voltage having a triangular wave shape is obtained. A bottom value v(0) and a top value v(t$_2$) of the output voltage having the triangular wave shape are calculated as indicated by the following expression.

$$v(0) = \frac{t_2}{t_1 + t_2} R i_s \qquad \text{[Math 11]}$$

$$v(t_2) = \frac{t_2 + \sigma t_1 t_2}{t_1 + t_2} R i_s$$

When the capacitance value C of the smoothing capacitor is further increased, since σ is approximated to 0, an output voltage waveform is asymptotic to a fixed direct-current value as indicated by the following expression.

$$v(t_2) \to v(0) = \frac{t_2}{t_1 + t_2} R i_s \qquad \text{[Math 12]}$$

where, a coefficient ρ=t$_2$/(t$_1$+t$_2$) is a ratio of an on period to one cycle of the on/off switching of the fourth switching element 14 and is called duty ratio of switching. Consequently, a desired output voltage is obtained by controlling the duty ratio of the fourth switching element 14.

As shown in FIG. 4 and FIG. 6, in a period in which the third switching element 13 is in the on state, the first and fourth switching elements 11 and 14 are retained in the off state. The second switching element 12 is subjected to the PWM control at, for example, 120 kHz. An output voltage waveform in the period in which the third switching element 13 is in the on state has polarity opposite to the polarity of the output voltage waveform in the period in which the first switching element 11 is in the on state.

When the first switching element 11 and the third switching element 13 are alternately subjected to on/off control at, for example, 60 Hz, an alternating-current voltage of 60 Hz is obtained as shown in FIG. 6. Note that, as shown in FIG. 6, in the PWM control of the second and fourth switching elements 12 and 14, an alternating current voltage having a sine wave shape is obtained by temporally changing the duty ratio ρ.

In this way, with the inverter (the power conversion circuit) 10, by subjecting the second and fourth switching elements 12 and 14 on the lower arm side to the switching control at a frequency higher than a frequency for the first and third switching elements 11 and 13 on the upper arm side, a switching element having relatively low operation speed and a low price can be used as the first and third switching elements 11 and 13 on the upper arm side. Further, a configuration having relatively low operation speed and a low price can be used as the driving circuit for the first and third switching elements 11 and 13 on the upper arm side. Therefore, with the inverter 10, it is possible to reduce a price.

Incidentally, when the CMOSFET is used as switching elements in a bridge-type circuit, there is an advantage that driving by a clock signal is easy. However, the PMOSFET on an upper arm side tends to have low operation speed compared with the NMOSFET on a lower arm side. There is a problem in that it is difficult to increase speed of switching control using the PWM system.

Concerning this problem, it is conceivable to configure the switching elements on the upper arm side with the NMOSFET as well. In this case, there is an advantage that an increase in speed of switching control by the NMOSFET is easy. However, an insulation device such as a photocoupler is necessary in a driving circuit for the NMOSFET on the upper arm side. There is a problem in which driving easiness of the switching elements is spoiled and a reduction in a price is also difficult.

However, the inverter 10 is suitable when the CMOSFET is used as the switching elements. It is possible to obtain high speed of the switching control, driving easiness of the switching elements, and a low price.

Figure 7:
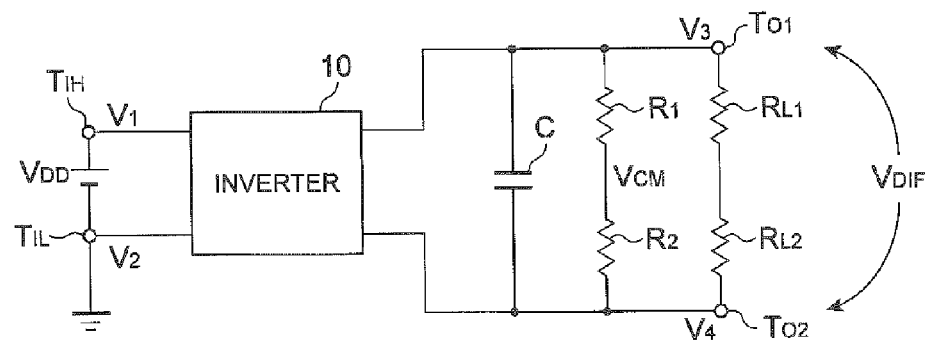
FIG. 7 is a simulation circuit diagram of an inverter 10 alone.

A common mode voltage on an output side of the inverter 10 is explained below. FIG. 7 is a simulation circuit diagram of the inverter 10 alone. FIG. 8 is a simulation result in FIG. 7. In FIG. 8(a), an output alternating-current voltage V$_{DIF}$ and an output common mode voltage V$_{CM}$ are shown. In FIG. 8(b), the output common mode voltage V$_{CM}$ is enlarged and shown. FIG. 9 is a principle diagram of voltages of sections on the output side. In FIG. 9(a), voltages V$_3$ and V$_4$ of the respective first and second output terminals T$_{O1}$ and T$_{O2}$ are shown. In FIG. 9(b), the output alternating-current voltage V$_{DIF}$ and the output common mode voltage V$_{CM}$ between the first and second output terminals T$_{O1}$ and T$_{O2}$ are shown.

Figure 10:
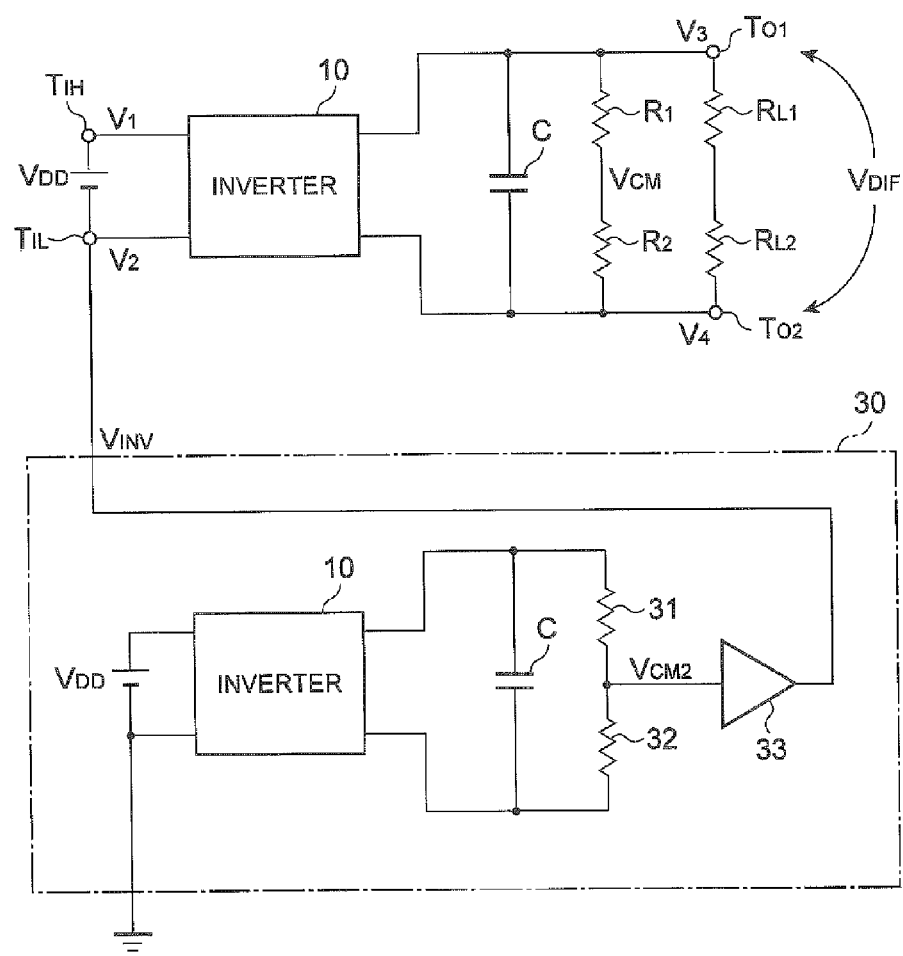
FIG. 10 is a simulation circuit diagram of the power conversion apparatus in the first embodiment.
Figure 11:
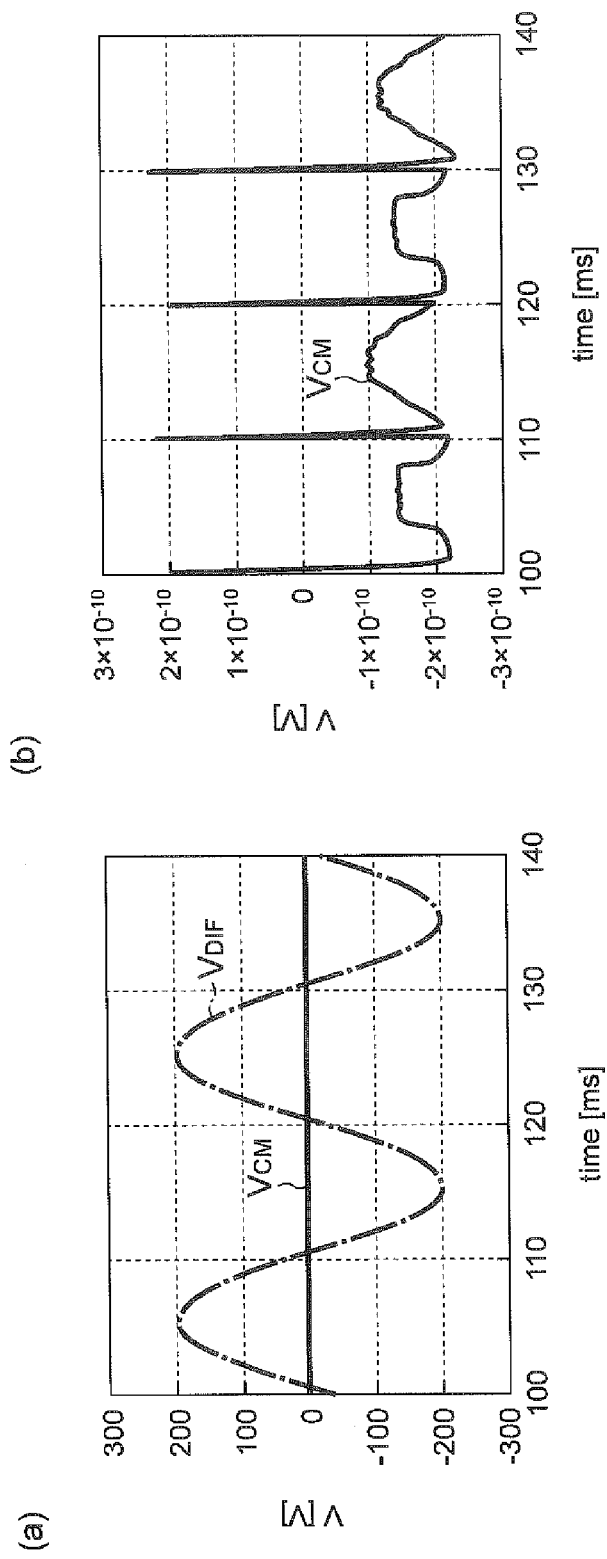
FIG. 11 is a simulation result in FIG. 10, wherein (a) is an output alternating-current voltage and an output common mode voltage and (b) is an enlarged output common mode voltage.

On the other hand, FIG. 10 is a simulation circuit diagram of the power conversion apparatus 1 in the first embodiment. FIG. 11 is a simulation result in FIG. 10. In FIG. 11(a), the output alternating-current voltage V$_{DIF}$ and the output common mode voltage V$_{CM}$ are shown. In FIG. 11(b), the output common mode voltage V$_{CM}$ is enlarged and shown. FIG. 12 is a principle diagram of voltages of sections on the output side. In FIG. 12(a), the voltages V$_3$ and V$_4$ of the respective first and second output terminals T$_{O1}$ and T$_{O2}$ are shown. In FIG. 12(b), the output alternating-current voltage V$_{DIF}$ and the output common mode voltage V$_{CM}$ between the first and second output terminals T$_{O1}$ and T$_{O2}$ are shown.

Note that simulation conditions are as described below.
An input direct-current voltage V$_{DD}$=400 V,
a switching frequency f of the first and third switching elements on the upper arm side=50 Hz,
the switching frequency f of the second and fourth switching elements on the lower arm side=100 kHz,
a duty ratio D of the PWM control during ON of the second and fourth switching elements=0 to 50%,
the capacitance value C of the smoothing capacitor=5 μF,
the resistance value R of the loads R$_{L1}$ and R$_{L2}$=50Ω, and
the resistance value R of resistance elements R$_1$ and R$_2$ for common mode voltage monitor=1 MΩ.

The output alternating-current voltage $V_{DIF}$ and the output common mode voltage $V_{CM}$ in FIG. 9 and FIG. 12 are calculated on the basis of the following principle.

$$V_{DIF} = V_3 - V_4$$

$$V_{CM} = (V_3 + V_4)/2$$

As shown in FIG. 8 and FIG. 9, in the inverter 10 alone, when the switching elements 12 and 14 on the lower arm side are subjected to the switching control at a frequency higher than a frequency for the switching elements 11 and 13 on the upper arm side, a high common mode voltage $V_{CM}$ is generated on the output side (the load side).

On the other hand, with the power conversion apparatus 1 in the first embodiment, as shown in FIGS. 11 and 12, the inverted-voltage generation circuit 30 generates, independently from the common mode voltage $V_{CM}$ generated on the output side, the common mode voltage $V_{CM2}$ equivalent (substantially equal) to the common mode voltage $V_{CM}$, inverts the common mode voltage $V_{CM2}$ to thereby generate the inverted voltage $V_{INV}$, and inputs the inverted voltage $V_{INV}$ to the low-voltage side input terminal $T_{IL}$. Therefore, it is possible to suppress the high common mode voltage $V_{CM}$ from being generated on the output side.

Second Embodiment

Figure 13:
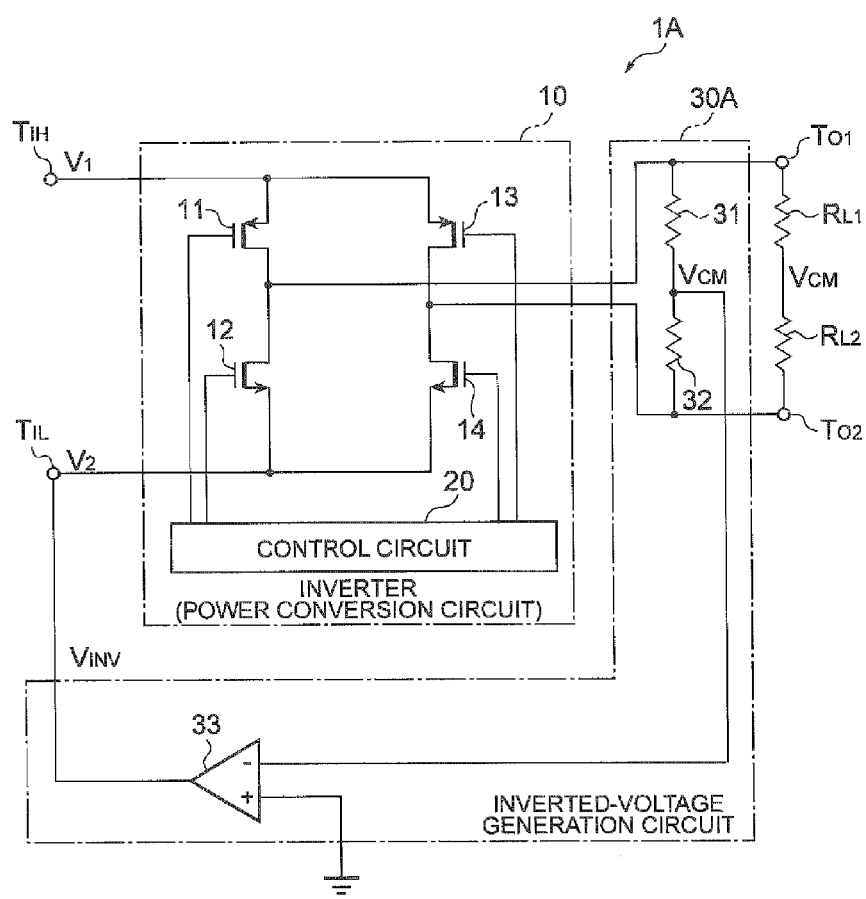
FIG. 13 is a circuit diagram showing in detail the power conversion apparatus in the second embodiment shown in FIG. 1.

FIG. 1 and FIG. 13 are circuit diagrams showing a power conversion apparatus according to a second embodiment of the present invention. A power conversion apparatus 1A in the second embodiment is different from the first embodiment in a configuration including an inverted-voltage generation circuit 30A instead of the inverted-voltage generation circuit 30 in the power conversion apparatus 1.

The inverted-voltage generation circuit 30A includes the resistance elements 31 and 32 connected in series between the first and second output terminals $T_{O1}$ and $T_{O2}$ and an inversion amplifier (e.g., an operational amplifier: a gain is 1000 times) 33. The inverted-voltage generation circuit 30A inverts the common mode voltage $V_{CM}$ itself generated between the first and second output terminals $T_{O1}$ and $T_{O2}$ to thereby generate the inverted voltage $V_{INV}$.

Figure 14:
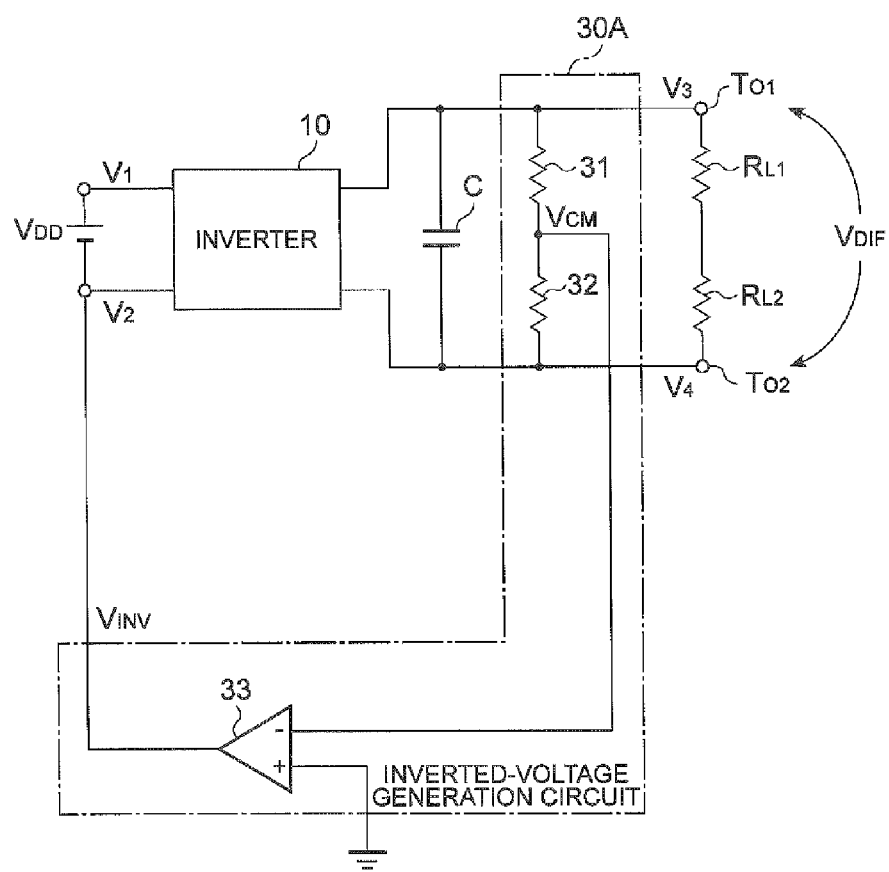
FIG. 14 is a simulation circuit diagram of the power conversion apparatus in the second embodiment.
Figure 15:
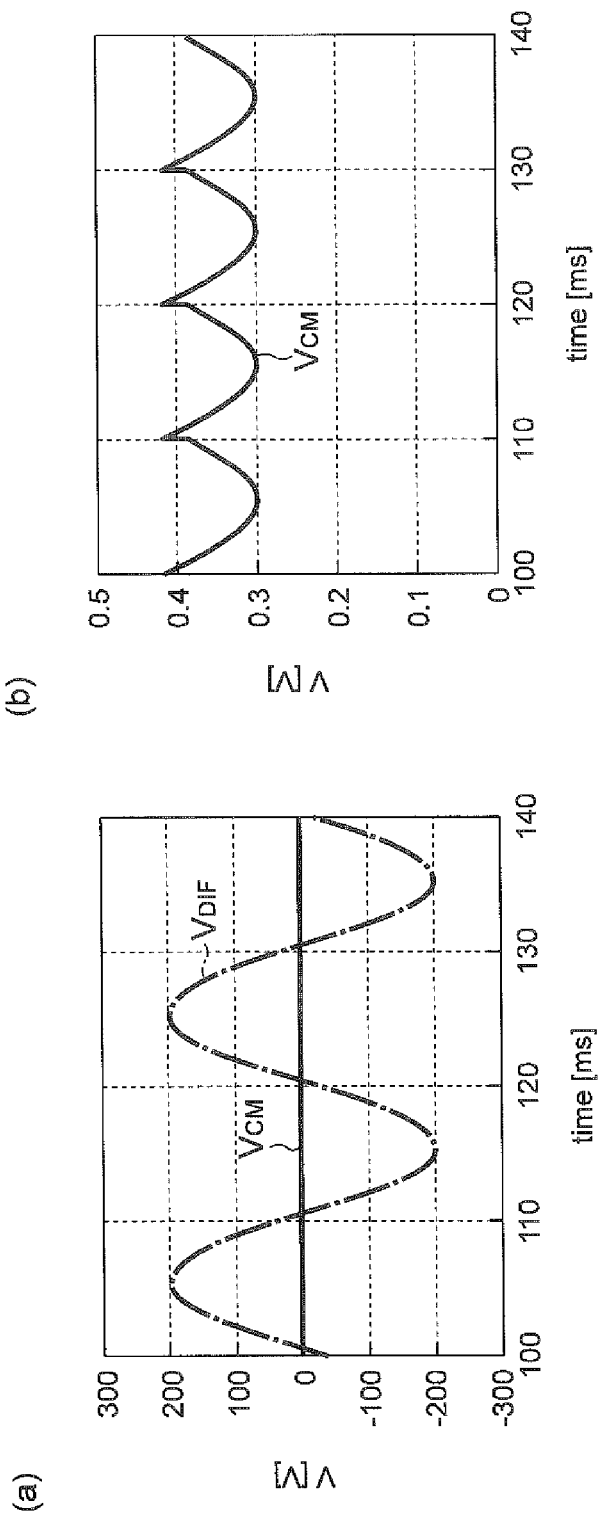
FIG. 15 is a simulation result in FIG. 14, wherein (a) is an output alternating-current voltage and an output common mode voltage and (b) is an enlarged output common mode voltage.

FIG. 14 is a simulation circuit diagram of the power conversion apparatus 1A in the second embodiment. FIG. 15 is a simulation result in FIG. 14. In FIG. 15(a), the output alternating-current voltage $V_{DIF}$ and the output common mode voltage $V_{CM}$ are shown. In FIG. 15(b), the output common mode voltage $V_{CM}$ is enlarged and shown. FIG. 16 is a principle diagram of voltages of sections on the output side. In FIG. 16(a), the voltages $V_3$ and $V_4$ of the respective first and second output terminals $T_{O1}$ and $T_{O2}$ are shown. In FIG. 16(b), the output alternating-current voltage $V_{DIF}$ and the output common mode voltage $V_{CM}$ between the first and second output terminals $T_{O1}$ and $T_{O2}$ are shown. Note that simulation conditions are the same as the conditions described above.

As shown in FIG. 15 and FIG. 16, with the power conversion apparatus 1A in the second embodiment, the inverted-voltage generation circuit 30A inverts the common mode voltage $V_{CM}$ itself generated on the output side to thereby generate the inverted voltage $V_{INV}$ and inputs the inverted voltage $V_{INV}$ to the low-voltage side input terminal $T_{IL}$. Therefore, it is possible to suppress, by the gain of the operational amplifier 33 (e.g., to ¹⁄₁₀₀₀ times), the high common mode voltage $V_{CM}$ from being generated on the output side.

Note that the present invention is not limited to this embodiment and various modifications are possible. For example, in the first embodiment, the form is illustrated in which the inverted-voltage generation circuit 30 includes the circuit configuration that is identical to the circuit configuration of the inverter 10. However, the inverted-voltage generation circuit 30 does not have to include the circuit configuration that is identical to the circuit configuration of the inverter 10 as long as the inverted-voltage generation circuit 30 can generate the common mode voltage $V_{CM2}$ equivalent (substantially equal) to the output common mode voltage $V_{CM}$ of the inverter 10.

In this embodiment, the form is illustrated in which the CMOSFET is used as the switching elements, that is, the PMOSFET is used as the switching elements on the upper arm side and the NMOSFET is used as the switching elements on the lower arm side. However, a combination of the switching elements on the upper arm side and the switching elements on the lower arm side is not limited to this embodiment.

For example, in transistors of all types such as an IGBT type and a bipolar type, as the switching elements on the upper arm side, a switching element having a conductivity type different from a conductivity type of the switching elements on the lower arm side and having operation speed lower than operation speed of the switching elements on the lower arm side may be used. Specifically, an N-channel type transistor may be used as the switching elements on the lower arm side and a P-channel type transistor may be used as the switching elements on the upper arm side.

For example, as the switching elements on the upper arm side, a switching element having structure different from the structure of the switching elements on the lower arm side and having operation speed lower than operation speed of the switching elements on the lower arm side may be used. Specifically, a switching element capable of performing relatively high-speed operation in a group of an FET, an IGBT (Insulated Gate Bipolar Transistor), a bipolar transistor, and a thyristor may be used as the switching elements on the lower arm side, and a switching element having relatively low operation speed and having structure different from the structure of the switching elements on the lower arm side in the group of the FET, the IGBT (Insulated Gate Bipolar Transistor), the bipolar transistor, and the thyristor may be used as the switching elements on the upper arm side.

For example, as the switching elements on the upper arm side, a switching element including a device different from a device of the switching elements on the lower arm side and having operation speed lower than operation speed of the switching elements on the lower arm side may be used. Specifically, a switching element including an SiC device capable of performing relatively high-speed operation may be used as the switching elements on the lower arm side, and a switching element including an Si device having relatively low operation speed may be used as the switching elements on the upper arm side.

In this embodiment, the switching elements on the lower arm side are subjected to the switching control at the frequency higher than the frequency for the switching elements on the upper arm side. However, the switching elements on the upper arm side may be subjected to the switching control at a frequency higher than a frequency for the switching elements on the lower arm side. In this case as well, a high common mode voltage is generated on the output side (the load side) of the inverter 10. However, it is possible to suppress, with the inverted-voltage generation circuits 30 and 30A, the high common mode voltage $V_{CM}$ from being generated on the output side.

In this embodiment, the switching elements on the upper arm side (i.e., the low speed side) are not subjected to the switching control using the PWM system. However, the switching elements on the upper arm side may be subjected to the switching control using the PWM system in a period of a half cycle of alternating-current power in which the switching elements are switched to the ON state. At this point, a switching frequency on the lower arm side is desirably twice or more as high as a switching frequency for the switching elements on the upper arm side. In this case, the switching control on the lower arm side and the switching control on the upper arm side are desirably synchronized.

INDUSTRIAL APPLICABILITY

It is possible to apply the present invention to a use for suppressing a high common mode voltage from being generated on the output side in the power conversion apparatus.

REFERENCE SIGNS LIST 1, 1A Power conversion apparatuses
10 Inverter (Power conversion circuit)
11 First switching element
12 Second switching element
13 Third switching element
14 Fourth switching element
20 Control circuit
30, 30A Inverted-voltage generation circuits
31, 32 Resistance elements
33 Inverting amplifier
$T_{IH}$ High-voltage side input terminal
$T_{IL}$ Low-voltage side input terminal
$T_{O1}$ First output terminal
$T_{O2}$ Second output terminal
$R_{L1}$, $R_{L2}$ Loads
$V_{CM}$ Common mode voltage in the power conversion apparatus and the inverter
$V_{CM2}$ Common mode voltage in the inverted-voltage generation circuit
$V_{INV}$ Inverted voltage

The invention claimed is:

1. A power conversion apparatus comprising:
a high-voltage side input terminal and a low-voltage side input terminal;
first and second output terminals;
a power conversion circuit that converts direct-current power input between the high-voltage side input terminal and the low-voltage side input terminal to generate alternating-current power between the first and second output terminals; and
an inverted-voltage generation circuit that generates an inverted voltage of a common mode voltage itself generated between the first and second output terminals and inputs the inverted voltage to the low-voltage side input terminal.

2. The power conversion apparatus according to claim 1, wherein
the power conversion circuit is a bridge-type power conversion circuit including:
first and second switching elements connected in series in this order between a high-voltage side input terminal and a low-voltage side input terminal, an intermediate node of the first and second switching elements being connected to the first output terminal; and
third and fourth switching elements connected in series in this order between the high-voltage side input terminal and the low-voltage side input terminal, an intermediate node of the third and fourth switching elements being connected to the second output terminal,
the power conversion circuit alternately switching a set of the first and fourth switching elements and a set of the second and third switching elements to an ON state to thereby convert direct-current power input between the high-voltage side input terminal and the low-voltage side input terminal to generate alternating-current power between the first and second output terminals, and
the power conversion circuit subjects one of the set of the first and third switching elements and the set of the second and fourth switching elements to switching control at a frequency higher than a frequency for the other set.

* * * * *